United States Patent
Peyre et al.

(10) Patent No.: US 11,351,955 B2
(45) Date of Patent: Jun. 7, 2022

(54) METHOD FOR FOLDING AN AIRBAG, AIRBAG FOLDED ACCORDING TO SUCH METHOD, AIRBAG, AIRBAG MODULE, AND VEHICLE SAFETY SYSTEM

(71) Applicants: TRW AUTOMOTIVE GMBH, Alfdorf (DE); DALPHIMETAL ESPANA S.A., Vigo (ES)

(72) Inventors: Jean-Christophe Peyre, Viana de Cega (ES); Ramon Ramos, Viana de Cega (ES)

(73) Assignees: DALPHI METAL ESPANA S.A., Vigo (ES); TRW AUTOMOTIVE GMBH, Alfdorf (DE)

( * ) Notice: Subject to any disclaimer, the term of this patent is extended or adjusted under 35 U.S.C. 154(b) by 178 days.

(21) Appl. No.: 15/305,109

(22) PCT Filed: May 5, 2015

(86) PCT No.: PCT/EP2015/000919
§ 371 (c)(1),
(2) Date: Oct. 19, 2016

(87) PCT Pub. No.: WO2015/169440
PCT Pub. Date: Nov. 12, 2015

(65) Prior Publication Data
US 2017/0174173 A1    Jun. 22, 2017

(30) Foreign Application Priority Data
May 7, 2014 (DE) .................. 10 2014 006 576.6

(51) Int. Cl.
*B60R 21/237* (2006.01)
*B60R 21/214* (2011.01)

(52) U.S. Cl.
CPC .......... *B60R 21/237* (2013.01); *B60R 21/214* (2013.01)

(58) Field of Classification Search
CPC ............................ B60R 21/214; B60R 21/237
See application file for complete search history.

(56) References Cited

U.S. PATENT DOCUMENTS

| 5,364,126 A | * | 11/1994 | Kuretake | .............. B60R 21/237 |
| | | | | 102/531 |
| 5,730,463 A | * | 3/1998 | Fisher | ................... B60R 21/207 |
| | | | | 280/728.1 |

(Continued)

FOREIGN PATENT DOCUMENTS

JP    2008007034    1/2008

*Primary Examiner* — Paul N Dickson
*Assistant Examiner* — Timothy Wilhelm
(74) *Attorney, Agent, or Firm* — Tarolli, Sundheim, Covell & Tummino LLP

(57) ABSTRACT

The invention relates to a method of folding an airbag (10), especially an airbag (10) to be arranged beneath a vehicle roof (50), comprising an injection orifice (11), a guiding portion (13) arranged adjacent thereto in the longitudinal direction and an inflating portion (12) arranged adjacent to the guiding portion (13) in the longitudinal direction, the method including flatly spreading the airbag (10); laterally folding, especially zigzag folding, at least in portions at least one side part (30; 30') of the airbag (10) in the direction of the longitudinal axis (L) of the airbag (10); furling the inflating portion (12) at least in portions starting from a trailing edge (26) of the airbag (10) that is maximally spaced from the injection orifice (11) in a first furling direction (AR) in the direction to the injection orifice (11); and forming the guiding portion (13) by laying at least one folding including a first folding bend (14) against the first furling direction (AR) so that the deployment behavior of the airbag (10) is influenced.

12 Claims, 12 Drawing Sheets

(56) References Cited

U.S. PATENT DOCUMENTS

| | | | | |
|---|---|---|---|---|
| 5,755,459 A | * | 5/1998 | LaLonde | B60R 21/201 |
| | | | | 280/728.3 |
| 5,884,939 A | * | 3/1999 | Yamaji | B60R 21/2171 |
| | | | | 280/743.1 |
| 6,460,885 B1 | * | 10/2002 | Bowser | B60R 21/231 |
| | | | | 280/743.1 |
| 6,588,793 B2 | * | 7/2003 | Rose | B60R 21/2171 |
| | | | | 280/728.2 |
| 6,767,030 B2 | * | 7/2004 | Yamaji | B60R 21/205 |
| | | | | 280/732 |
| 6,832,779 B2 | * | 12/2004 | Tajima | B60R 21/231 |
| | | | | 280/740 |
| 6,976,705 B2 | * | 12/2005 | Klaiber | B60R 21/237 |
| | | | | 280/730.2 |
| 7,004,501 B2 | * | 2/2006 | Schneider | B60R 21/237 |
| | | | | 280/743.1 |
| 7,150,470 B2 | * | 12/2006 | Okada | B60R 21/205 |
| | | | | 280/743.1 |
| 7,234,728 B2 | * | 6/2007 | Noguchi | B60R 21/232 |
| | | | | 280/730.2 |
| 7,404,570 B2 | * | 7/2008 | Miyata | B62J 27/00 |
| | | | | 280/728.2 |
| 7,441,796 B2 | * | 10/2008 | Noguchi | B60R 21/232 |
| | | | | 280/730.2 |
| 7,445,239 B2 | * | 11/2008 | Okada | B60R 21/237 |
| | | | | 280/743.1 |
| 7,648,159 B2 | * | 1/2010 | Miyata | B62J 27/00 |
| | | | | 280/730.1 |
| 7,900,958 B2 | * | 3/2011 | Yamauchi | B60R 21/231 |
| | | | | 280/732 |
| 8,407,968 B2 | * | 4/2013 | Lachat | B60R 21/201 |
| | | | | 53/429 |
| 8,540,276 B2 | * | 9/2013 | Schneider | B60R 21/237 |
| | | | | 280/730.1 |
| 8,641,088 B2 | * | 2/2014 | Wiik | B60R 21/213 |
| | | | | 280/730.2 |
| 8,684,401 B2 | * | 4/2014 | Shibayama | B60R 21/2334 |
| | | | | 280/730.2 |
| 8,746,738 B2 | * | 6/2014 | Matsui | B60R 21/237 |
| | | | | 280/743.1 |
| 9,849,858 B2 | * | 12/2017 | Inazumi | B60R 21/2338 |
| 9,925,943 B2 | * | 3/2018 | Ohno | B60R 21/207 |
| 10,328,886 B2 | * | 6/2019 | Peyre | B60R 21/261 |
| 10,384,633 B2 | * | 8/2019 | Warm | B60R 21/2165 |
| 2002/0084635 A1 | * | 7/2002 | Tajima | B60R 21/239 |
| | | | | 280/732 |
| 2002/0096864 A1 | * | 7/2002 | Asano | B60R 21/232 |
| | | | | 280/730.2 |
| 2003/0052476 A1 | | 3/2003 | Rose | |
| 2005/0070414 A1 | * | 3/2005 | Schneider | B60R 21/237 |
| | | | | 493/405 |
| 2007/0284858 A1 | * | 12/2007 | Nishimura | B60R 21/217 |
| | | | | 280/729 |
| 2008/0238052 A1 | | 10/2008 | Iida et al. | |
| 2010/0225096 A1 | | 9/2010 | Bustos Garcia et al. | |
| 2017/0043738 A1 | * | 2/2017 | Peyre | B60R 21/214 |

* cited by examiner

METHOD FOR FOLDING AN AIRBAG, AIRBAG FOLDED ACCORDING TO SUCH METHOD, AIRBAG, AIRBAG MODULE, AND VEHICLE SAFETY SYSTEM

RELATED APPLICATIONS

This application corresponds to PCT/EP2015/000919, filed May 5, 2015, which claims the benefit of German Application No. 10 2014 006 576.6, filed May 7, 2014, the subject matter of which are incorporated herein by reference in their entirety.

BACKGROUND OF THE INVENTION

The invention relates to a method of folding an airbag, especially an airbag to be arranged beneath the vehicle roof, comprising an injection orifice, a guiding portion arranged adjacent thereto in the longitudinal direction and an inflating portion arranged adjacent to the guiding portion in the longitudinal direction. In addition, the invention relates to an airbag folded in accordance with the method according to the invention. Furthermore the invention relates to an airbag, an airbag module as well as a vehicle safety system.

From the state of the art so called bag-in-roof (BIR) airbag modules are known. They are usually arranged on the vehicle roof in the area or, resp., in the vicinity of the upper windscreen rim. In WO 2007/014581 A1, for example, an airbag module of this type is described. In the case of activation the airbag is inflated and thus forced out of the casing. A module lining includes in the area of the airbag a predetermined breaking point or an opening through which the airbag is forced into the interior of the vehicle and will deploy there. It has shown that the airbag frequently deploys suddenly vertically starting from the vehicle roof so that the deployed airbag may impact directly on the legs of the vehicle occupant and the latter is not optimally protected against vehicle crash. It has further turned out that the deployment behavior of an airbag is strongly influenced by the manner of folding.

SUMMARY OF THE INVENTION

It is the object of the present invention to provide a method of folding an airbag by which the airbag exhibits optimized deployment behavior and will preferably deploy along a windscreen. It is another object to state a further developed airbag characterized by optimized deployment behavior in the direction of a windscreen.

Moreover it is an object of the invention to state an airbag module and a vehicle safety system comprising a further developed airbag.

In accordance with the invention, this object is achieved with respect to the method of folding an airbag by the subject matter of claim 1, with respect to the airbag by the subject matter of claim 8 or 9, with respect to the airbag module by the subject matter of claim 14 and with respect to the vehicle safety system by the subject matter of claim 15.

Advantageous and expedient configurations of the method according to the invention of folding an airbag and of the airbag according to the invention, respectively, are described in the subclaims.

The method according to the invention of folding an airbag especially relates to an airbag to be arranged beneath a vehicle roof. The airbag includes an injection orifice, a guiding portion arranged adjacent thereto in the longitudinal direction and an inflating portion arranged adjacent to the guiding portion in the longitudinal direction. Accordingly, the injection orifices, the guiding portion and the inflating portion are arranged in series in the longitudinal extension of the airbag so that the guiding portion is arranged between the inflating portion and the injection orifice. According to the invention, the method comprises the following steps of:

flatly spreading the airbag;

laterally folding, especially zigzag folding, at least in portions at least one side part of the airbag in the direction of the longitudinal axis of the airbag;

furling the inflating portion at least in portions starting from a trailing edge of the airbag maximally spaced apart from the injection orifice in a first furling direction in the direction of the injection orifice;

Configuring the guiding portion by laying at least one folding having a first folding bend against the first furling direction so that the deployment behavior of the airbag is influenced.

Accordingly, the invention is based on the idea of laterally folding, after flatly spreading the airbag, first at least one side part of the airbag, preferably both side parts of the airbag at least in portions, wherein folding and especially zigzag folding is carried out in the direction of the longitudinal axis of the airbag. The longitudinal axis of the airbag corresponds to the deployment direction of the airbag provided in the case of application. The folding bends or edges or folds of the folded side parts of the airbag consequently extend in the longitudinal direction of the airbag and, resp., at right angles with the width of the airbag.

After the lateral folding carried out at least in portions of at least one side part of the airbag the inflating portion is furled at least in portions. Upon furling the inflating portion it is started from the trailing edge of the airbag corresponding to the edge of the airbag which is spaced maximally from the injection orifice. The trailing edge is furled in the direction of the injection orifice. This corresponds to the first furling direction. Subsequently, the guiding portion of the airbag is formed. This is done by laying at least one folding having a first folding bend against the first furling direction so that the deployment behavior of the airbag is influenced. In other words, the guiding portion in relation to the furled inflating portion forms a first counter-directed folding which influences the deployment behavior of the airbag such that the latter deploys along the windscreen. In the following, by folding not only introducing a fold has to be understood. Rather, a folding describes arranging folding layers relative to each other which are arranged or will be arranged relative to each other by means of a folding bend and/or a fold and/or an edge.

The furling of the furling portion at least in portions has to be understood so that this part of the airbag is folded by the fact that starting from the afore-mentioned trailing edge plural folded layers and airbag layers, resp., are formed by way of a furling operation, for example. However, this can also be carried out in one folding operation. Accordingly, plural airbag layers are superimposed, wherein the superimposed airbag layers are arranged in the form of a folded spiral seam. Hence furling designates the folding of a partial area of the airbag by winding, wherein this can be performed with or without edges, wherein the forming of folds or edges is assumed to be a folding and a winding without folds is assumed to be furling or winding of general kind.

In the case of activation of the airbag the gas flows through the injection orifice first into the guiding portion of the airbag, before it flows into the inflating portion of the airbag and deploys the same. At first the guiding portion inflates by the inflowing gas. The folded guiding portion of the airbag deploys due to the inflowing gas and in this way can force the still furled inflating portion of the airbag out of a casing and/or out of a cover. The guiding portion thus causes well-directed deployment of the airbag along a windscreen, if the airbag folded by a method according to the invention is arranged beneath a vehicle roof in the area of the upper windscreen rim and the opening of the casing points in the direction of the windscreen.

After that the gas flows into the inflating portion of the airbag and fills the same. This method of folding an airbag ensures that in the case of activation first the guiding portion is inflated and the latter forces and, resp., guides the partially filled airbag with the inflating portion still being furled in the longitudinal direction or in the longitudinal extension of the airbag.

The guiding portion can be folded, at least in portions, concertina-like against the first furling direction in accordance with a first embodiment of the method according to the invention.

It is moreover imaginable that at least one first and one second folded layer of the guiding portion are laid starting from the first folding bend such that they constitute a first opening pointing in the direction of the injection orifice and thus to the first furling direction. In this context, the opening is understood to be the area of two folded layer arrangements which has no folding bend but enables access said folding bend.

In another embodiment of the invention, a formation of at least a second folding bend in the guiding portion may follow, wherein starting from the second folding bend the second folded layer and a third folded layer form a second opening pointing away from the injection orifice or being orientated against the first furling direction, respectively. Accordingly, the first opening and the second opening are facing each other.

Further, a formation of at least a third folding bend in the guiding portion may follow, wherein starting from the third folding bend the third folded layer and a fourth folded layer form a third opening pointing in the direction of the injection orifice. Accordingly, the first and third openings point in the same direction, namely in the direction of the injection orifice. This direction corresponds to the first furling direction. The second opening and the third opening consequently point toward each other or in opposite directions.

If in the guiding portion three folding bends are formed of four folded layers, the guiding portion can take a cross-sectional T-shape in a longitudinal section across the folded airbag.

The method according to the invention may further provide additional folding, especially zigzag folding, of at least one side part of the furled inflating portion, wherein folding is carried out at right angles with the first furling direction. After forming a guiding portion a further folding operation may accordingly follow. Both side parts of the furled inflating portion may be provided to be additionally folded, especially zigzag folded. Hence the folding bends and/or edges and/or folds extend in the longitudinal direction of the airbag and, resp., at right angles with the width of the airbag.

The additional folding, especially zigzag folding, of at least one side part may be performed up to the width of the injection orifice. In other words, at least one side part and preferably both side parts are folded or zigzag folded until the side parts and, accordingly, the entire airbag exhibit the width of the injection orifice. In this way, an as compact shape as possible is imparted to the folded airbag so that in such shape the latter can be mounted into a casing and/or beneath a cover in a space-saving manner.

Within the scope of another aspect, the invention is based on the idea of describing an airbag that has been folded according to an afore-described method according to the invention. Advantages similar to those explained already in connection with the afore-described method according to the invention are resulting.

As regards an airbag, the object is further achieved by the features of claim 9. Hence the airbag serves especially for being arranged beneath a vehicle roof, the airbag comprising an injection orifice and an inflating portion. According to the invention, the airbag includes a guiding portion disposed between the injection orifice and the inflating portion, wherein the inflating portion is furled in a first furling direction in the direction of the injection orifice and the guiding portion is formed by laying at least one folding having a first folding bend against the first folding direction so that the deployment behavior of the airbag can be influenced.

In other words, the airbag comprises three parts or three portions, i.e. an injection orifice, an inflating portion and a guiding portion, the guiding portion being formed between the injection orifice and the inflating portion. Adjacent to the injection orifice in the longitudinal direction the guiding portion is formed, wherein the inflating portion is formed at the guiding portion in the longitudinal direction. Advantages similar to those explained already in connection with the afore-described method according to the invention are resulting.

The guiding portion may be folded concertina-like at least in portions against the first furling direction. It is further imaginable that first and second folded layers of the guiding portion are laid starting from the first folding bend such that they form a first opening pointing in the direction of the injection orifice. Accordingly, the first opening points to the first furling direction. In this context, the opening is understood to be the area of two folded layer arrangements having no folding bend but enabling access to said folding bend. In this context, the folding bend is understood to be the formation of a rounding as well as an edge and/or a fold.

In addition, in the guiding portion a second folding bend may be formed, wherein a second opening pointing away from the injection orifice is formed by the second folded layer and a third folded layer. The second opening thus points in a direction opposed to the first furling direction. The first opening and the second opening are thus facing each other. The first opening and the second opening may be arranged in horizontal extension relative to each other or may be provided on a line parallel to the longitudinal axis of the airbag.

It may be further provided that in the guiding portion a third folding bend is formed, wherein starting from the third folding bend a third opening pointing in the direction of the injection orifice is formed by the third folded layer and a fourth folded layer. The first opening and the third opening hence point to the same direction, i.e. to the direction of the inflating opening and to the first furling direction, respectively. The second opening and the third opening are consequently facing each other. If in the guiding portion three folding bends are formed, the guiding portion may be T-shaped when viewed from the side.

Furthermore, the airbag may include an additional folding, especially zigzag folding of at least one side part of the furled inflating portion. The folding is carried out at right angles with the first furling direction so that the folding bends formed and/or the edges and/or the folds are configured substantially in parallel to each other in the direction of the first furling direction.

Within the scope of an independent aspect, the invention is based on the idea to describe an airbag module, especially for being arranged beneath a vehicle roof, comprising an afore-described inflator. The airbag module according to the invention further comprises an inflator for inflating the airbag. Advantages similar to those explained already in connection with the afore-described method according to the invention and, resp., with the airbag according to the invention are resulting.

For example, the inflator is a tubular inflator, wherein the longitudinal axis of the inflator is located in parallel to the furled inflating portion of the airbag and/or perpendicularly to the first furling direction. For this reason, an airbag module can be made available in an especially space-saving shape.

As regards a vehicle safety system, the object is achieved by the features of claim 15. Accordingly, a vehicle safety system includes an airbag according to the invention and/or an airbag module according to the invention. Advantages similar to those already explained in connection with the afore-described method according to the invention of folding an airbag and/or with the airbag according to the invention and/or with the inflator according to the invention are resulting.

In an embodiment of the vehicle safety system the airbag and/or the airbag module is/are arranged behind a cover of the vehicle roof liner of a vehicle in the area of an upper windscreen rim, wherein upon release the airbag is deployable and inflatable along the windscreen. Hence a vehicle safety system is described which in connection with a bag-in-roof airbag module offers high occupant protection, as the airbag of the vehicle safety system is deployable and inflatable along the windscreen and thus the airbag is prevented from impacting on the legs of the vehicle occupant and instead the head and thorax area of the vehicle occupant are protected.

BRIEF DESCRIPTION OF THE DRAWINGS

Hereinafter the invention will be illustrated in detail by way of exemplary embodiments with reference to the enclosed schematic drawings. Further features and advantages of the Invention will be resulting from the following description in connection with said drawings, in which.

Figure 1:
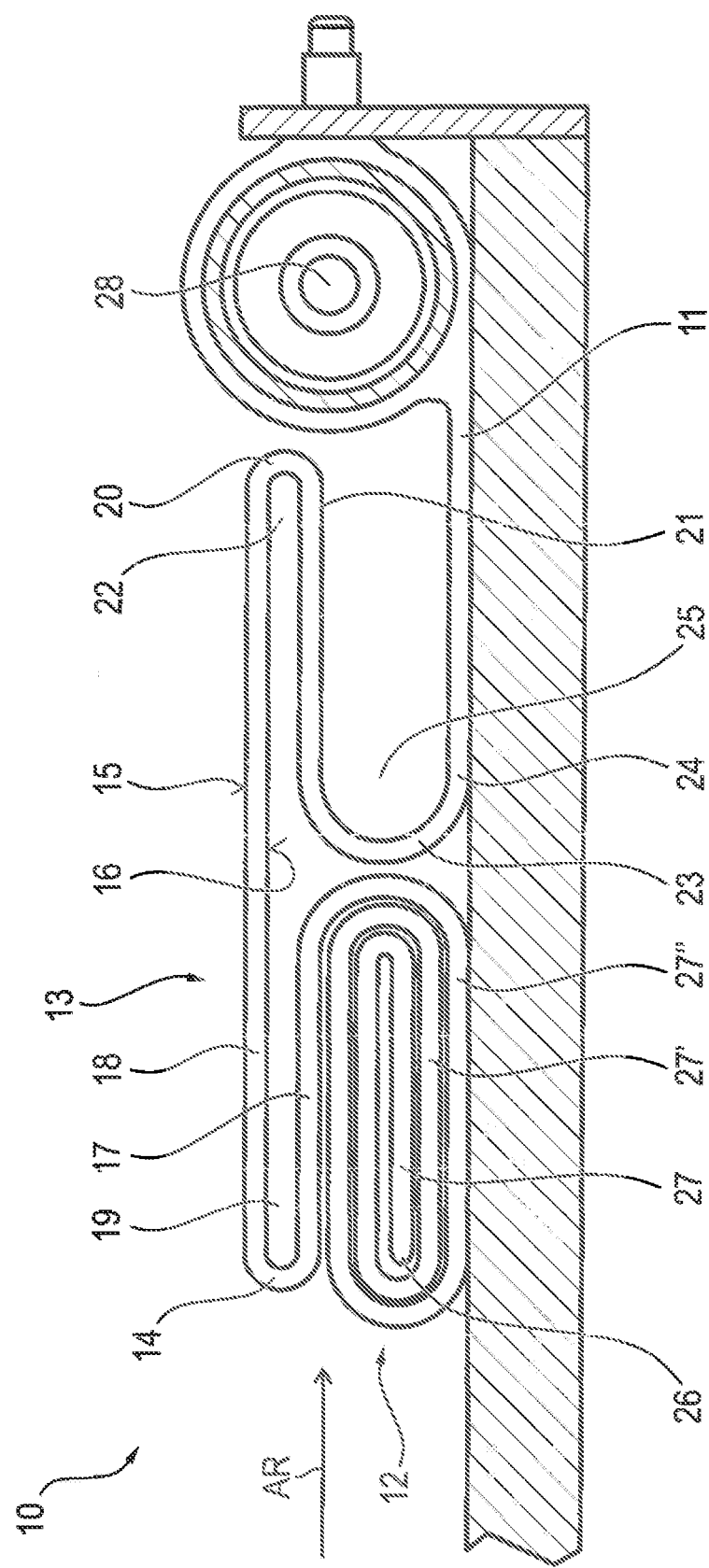
FIG. 1: shows a sectional view of an airbag according to the invention.

In the following equal reference numerals will be used for equal and equally acting components.

DESCRIPTION

FIG. 1 illustrates an airbag 10 according to the invention in the folded state. This airbag 10 is especially suited for being arranged beneath a vehicle roof.

The airbag 10 comprises an injection orifice 11 and an inflating portion 12. A guiding portion 13 is arranged between the injection orifice 11 and the inflating portion 12. The inflating portion 12 is furled in a first furling direction AR pointing in the direction of the injection orifice 11. The guiding portion 13 is formed by laying at least on folding with a first folding bend 14 against the first furling direction AR so that the deployment behavior of the airbag 10 can be influenced. In the airbag 10 shown in FIG. 1 the upper side 15 and the lower side 16 are directly superimposed so that folding of the airbag 10 relates to both the upper side 15 of the airbag 10 and the lower side 16 of the airbag 10. Hence an upper airbag layer, i.e. the upper side 15, and a lower airbag layer, i.e. the lower side 16, are arranged unchanged, preferably in parallel to each other, even during folding.

In the case of activation of the airbag 10 the gas flows through the injection orifice 11 first into the guiding portion 13, before it will flow into the furled inflating portion 12 of the airbag 10 and will deploy the latter. By the inflowing gas at first the guiding portion 13 formed to have at least a first folding bend 14 is inflated. The folded guiding portion 13 of the airbag 10 deploys by the inflowing gas and thus forces the still furled inflating portion 12 out of a casing or out of a cover, respectively. Subsequently the gas flows into the inflating portion 12 of the airbag 10 and fills the same. This method ensures that the folded airbag 10 is deployable and inflatable along the windscreen upon release, when it is appropriately mounted beneath a vehicle roof, preferably in the area of an upper windscreen rim.

The guiding portion 13 includes plural folded layers, wherein starting from the first folding bend 14 a first folded layer 17 and a second folded layer 18 of the guiding portion 13 are laid such that they form a first opening 19 pointing in the direction of the injection orifice 11. The opening direction of the first opening 19 thus corresponds to the furling direction AR. The first folded layer 17 and the second folded layer 18 are arranged in parallel to each other and can be or are positioned relative to each other by means of the first folding bend 14. The first folding bend 14 is curved, wherein in this context also the formation of an edge and/or a fold is possible.

In the guiding portion 13 a second folding bend 20 is additionally formed, wherein starting from the second folding bend 20 a second opening 22 facing away from the injection orifice 11 is formed by the second folded layer 18 and a third folded layer 21. The second folded layer 18 and the third folded layer 21 are arranged in parallel to each other and can be or are positioned relative to each other by means of the second folding bend 20. In this context, too, the second folding bend 20 may be provided to be formed in a curved shape as in the shown example and/or with an edge and/or with a fold. The first opening 19 and the second opening 22 are facing each other, wherein the second opening 22 thus points away from the injection orifice 11. The second opening 22 consequently points to the direction opposed to the first furling direction AR.

In the guiding portion 13 a third folding bend 23 is formed, wherein starting from the third folding bend 23 a third opening 25 pointing to the direction of the injection orifice 11 is formed by the third folded layer 21 and a fourth folded layer 24. The opening direction of the third opening 25 thus corresponds to the opening direction of the first folding bend 14 and hence to the first furling direction AR. The third folded layer 21 and the fourth folded layer 24 are arranged in parallel to each other and are connected by means of the bent third folding bend 23 or are arranged relative to each other by means of the third folding bend 23, respectively.

According to the embodiment of FIG. 1, the guiding portion 13 comprises three folding bends 14, 20 and 23 so that the guiding portion 13 with the four folded layers 17, 18, 21 and 24 is T-shaped in the longitudinal section when viewed appropriately from the side. What is crucial to the functioning of the airbag 10 is the design of the first folding bend 14 which is folded or furled against the first furling direction AR. By means of the first folding bend 14 thus a first inversely directed rolling fold is formed relative to the furled inflating portion 12.

In the case of activation the gas is blown via the injection orifice 11 first in the direction of the third folding bend 23 so that the third folding bend 23 initially causes horizontal displacement, viz. against the furling direction AR, of the second folding bend 20 and of the first folding bend 14. Also the inflation of the second folding bend 20 as well as of the first folding bend 14 causes the inflation behavior of the airbag 10 to be guided in the horizontal direction against the first furling direction AR so that the purpose of the guiding portion 13, viz. influenced deployment of the airbag along a windscreen, is satisfied. The guiding portion 13 may also include merely a first folding bend 14, i.e. merely a first folded layer 17 and a second folded layer 18. The formation of a second folding bend 20 and/or a third folding bend 23 is optional, but it enhances the mode of action of the airbag 10 according to the invention.

Figure 2A:
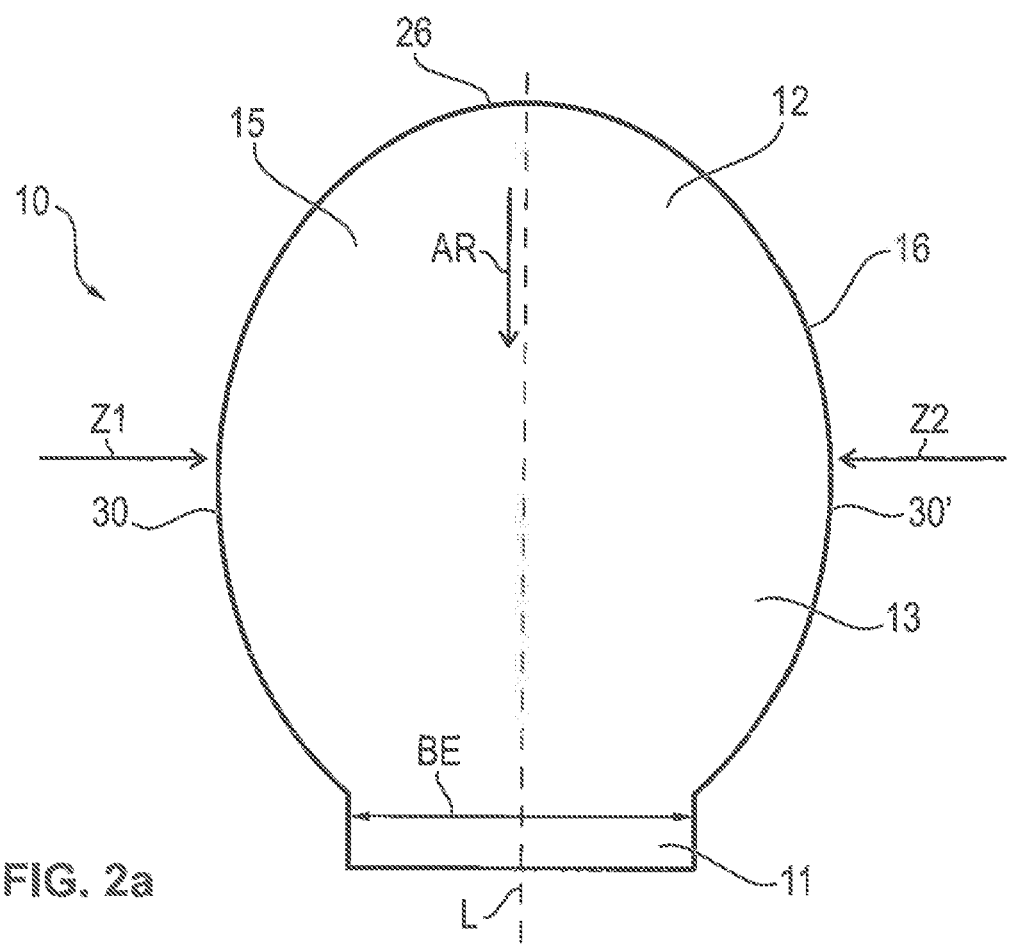
FIGS. 2a-2e: show individual method steps following the method of folding an airbag according to the invention.

The inflating portion 12 is arranged in the longitudinal extension of the airbag 10 adjacent to the guiding portion 13, with the guiding portion 13 being adjacent to the injection orifice 11 in the longitudinal direction. The inflating portion 12 is furled, i.e. starting from the trailing edge 26 which in the spread state of the airbag 10 (cf. FIG. 2a) constitutes the edge of the airbag 10 that is maximally spaced apart from the injection orifice 11 the inflating portion 12 is furled in the furling direction AR, viz. in the direction to the injection orifice 11. Plural layers 27, 27', 27" each of which covers a previous layer of the inflating portion 12 are formed. Accordingly, a winding of three winding layers 27, 27', 27" is formed by furling the inflating portion 12 starting from the trailing edge 26. The furling of the inflating portion 12 describes a winding operation which may be designed either with folding bends as shown in FIG. 1 or with edges and/or folds.

The airbag 10 according to the Invention may be part of the airbag module. Hence in the injection orifice 11 of the airbag 10 an inflator 28 may be arranged. Preferably the inflator 28 is a tubular inflator, with the longitudinal axis of the inflator 28 extending perpendicularly to the first furling direction AR and, resp., in parallel to the longitudinal extension of the folding bends 14, 20 and 23. Due to the design of a tubular inflator 28 an especially space-saving shape is imparted to the airbag module.

In FIGS. 2a-2e the airbag 10 according to the invention is shown as regards the Individual method steps according to the invention. At first, the airbag 10 is flatly spread. There are visible the injection orifice 11, the guiding portion 13 and the inflating portion 12. The edge of the airbag 10 maximally spaced apart from the injection orifice 11 is the trailing edge 26. The upper side 15 and the lower side 16 of the airbag 10 will be maintained hereinafter as to their relative arrangement, i.e. the airbag 10 is folded while the upper side 15 and the lower side 16 of the airbag 10 are maintained to be arranged relative to each other, congruently at least in portions.

In a first step lateral folding of the side parts 30 and 30' of the airbag in portions is carried out in the direction of the longitudinal axis L of the airbag 10. For this purpose, the side parts 30 and 30' are folded by means of zigzag folds in the direction of the longitudinal axis L of the airbag 10. The left side part 30 is zigzag folded in the folding direction Z1. The folding direction extends perpendicularly to the longitudinal axis L of the airbag 10. The zigzag folds introduced to the side part 30 in turn extend in the longitudinal direction L of the airbag. The right side part 30' is equally zigzag folded in the direction of the longitudinal direction L of the airbag 10, with the folding direction Z2 extending perpendicularly to the longitudinal axis L of the airbag 10. The folding direction Z1 and the folding direction Z2 thus extend in parallel to each other in the opposite direction. The zigzag folds incorporated in the right side part 30' extend in the direction of the longitudinal axis L of the airbag 10.

Figure 2B:
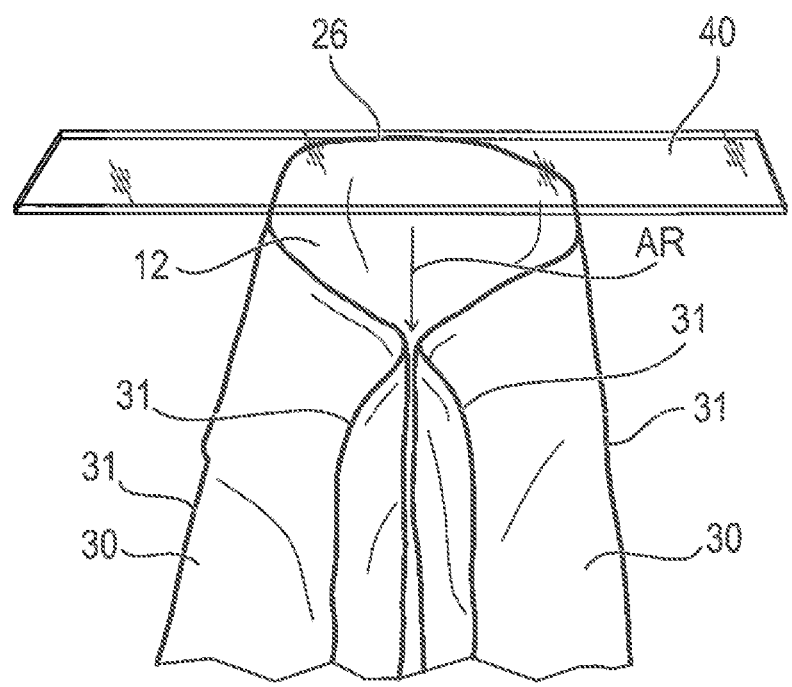
Figure 2C:
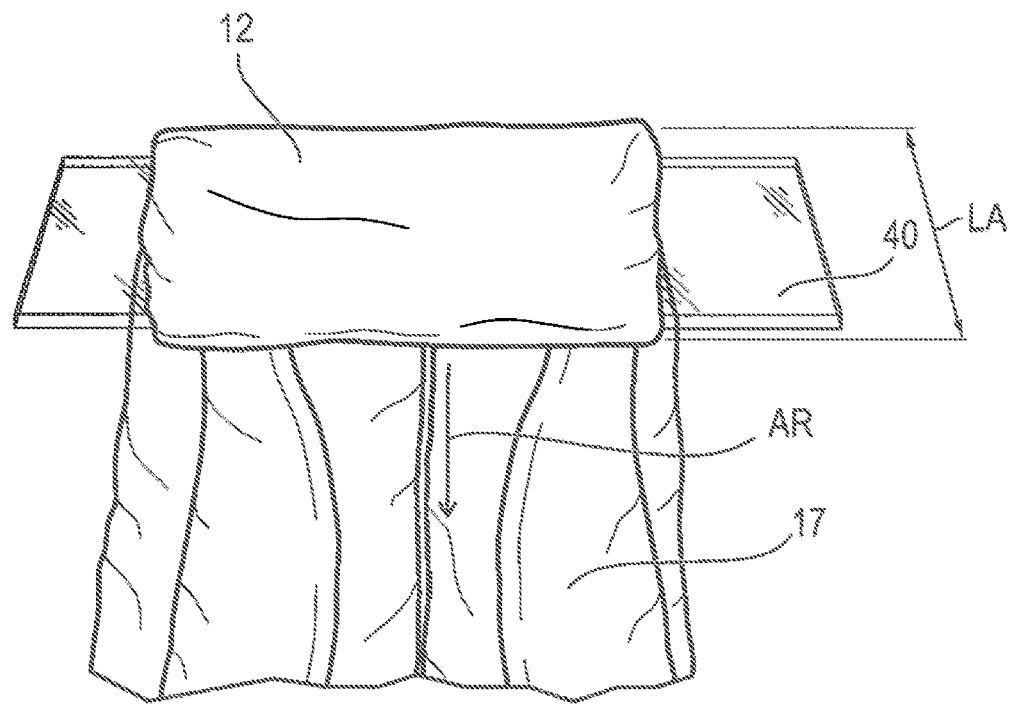

The folds 31 of the zigzag folding of the side parts 30 and 30' are illustrated in FIG. 2b. Then there follows the furling in portions of the inflating portion 12, starting from the trailing edge 26 of the airbag 10 in the first furling direction AR. The latter extends along the longitudinal axis L of the airbag 10. As is shown in FIG. 2c, the inflating portion 12 may be furled by an auxiliary means 40. With the help thereof, uniform furling or winding of the inflating portion 12 may be performed, with the length LA of the inflating portion 12 in this case amounting to 70 mm. The length LA may range from 100 and 50 mm, especially from 90 and 60 mm, especially from 80 and 65 mm.

Figure 2D:
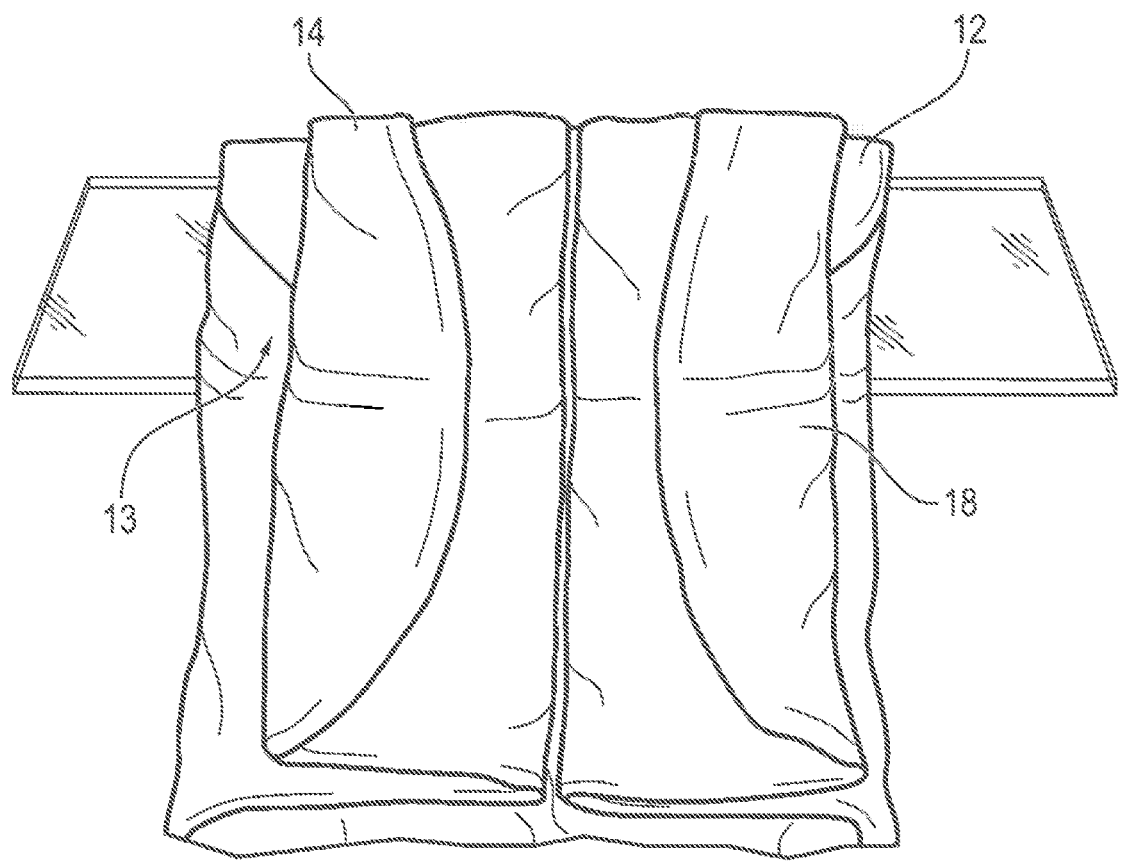

FIG. 2d illustrates the formation of the guiding portion 13 by laying at least one folding having a first folding bend 14. The guiding portion 13 is formed so that the deployment behavior of the airbag 10 is influenced. The folding bend 14 is formed by laying a first folded layer 17 against the furling direction AR and by laying a second folded layer 18 in the furling direction AR so that the first folding bend 14 and a first opening 19 pointing in the direction of the injection orifice 11 and, resp., in the first furling direction AR are formed.

Figure 2E:
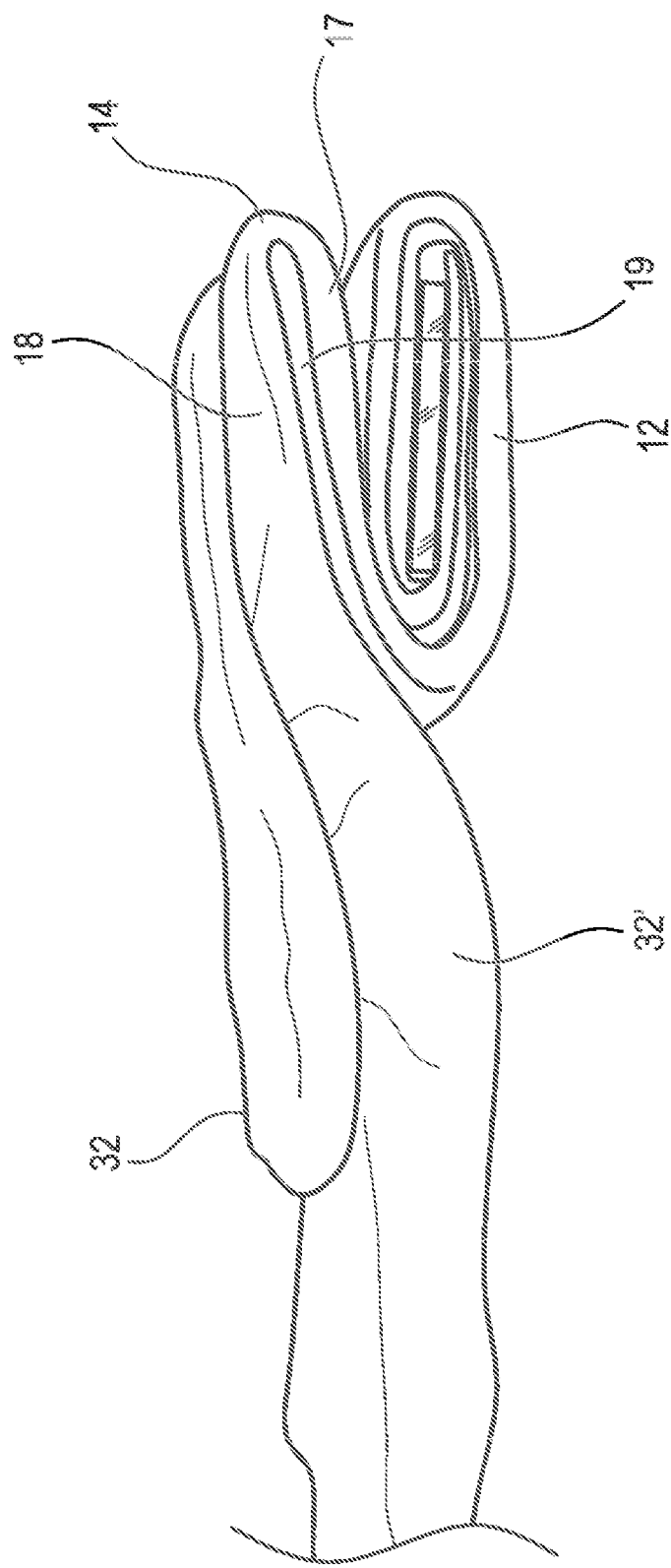
Figure 3A:
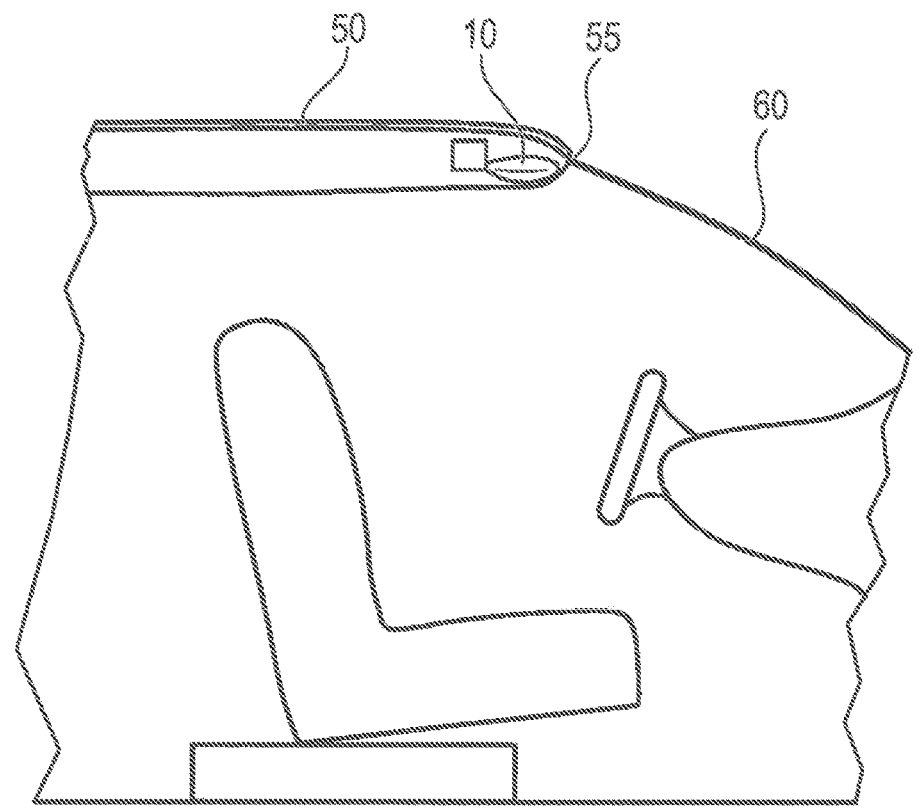
FIGS. 3a-3f: show individual phases of a release operation in connection with an airbag according to the invention.
Figure 3B:
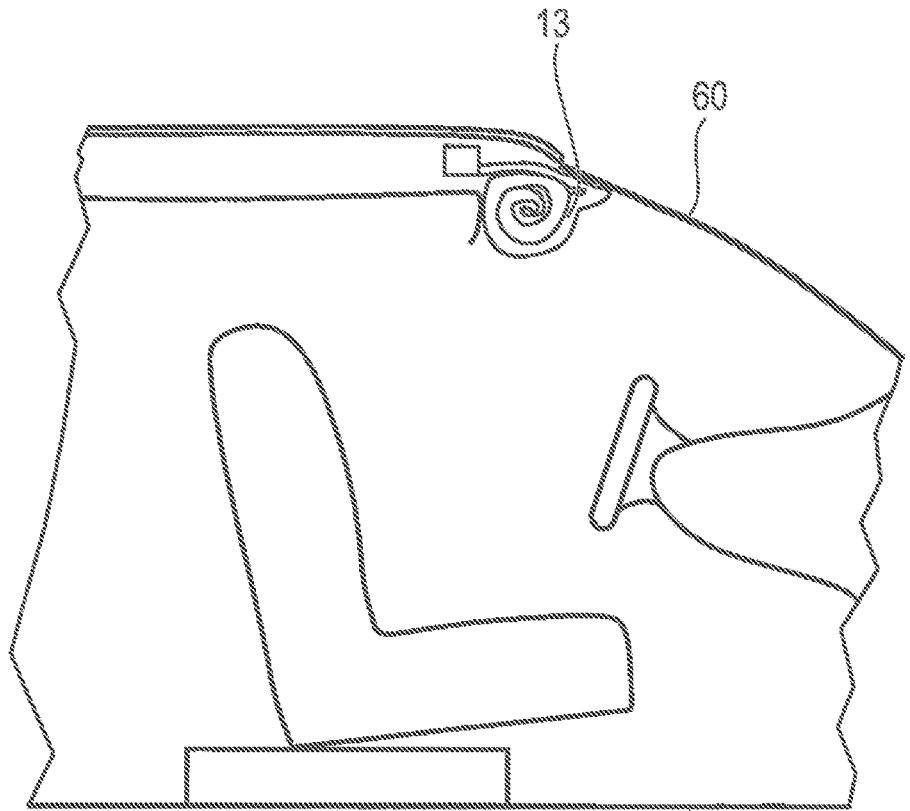
Figure 3C:
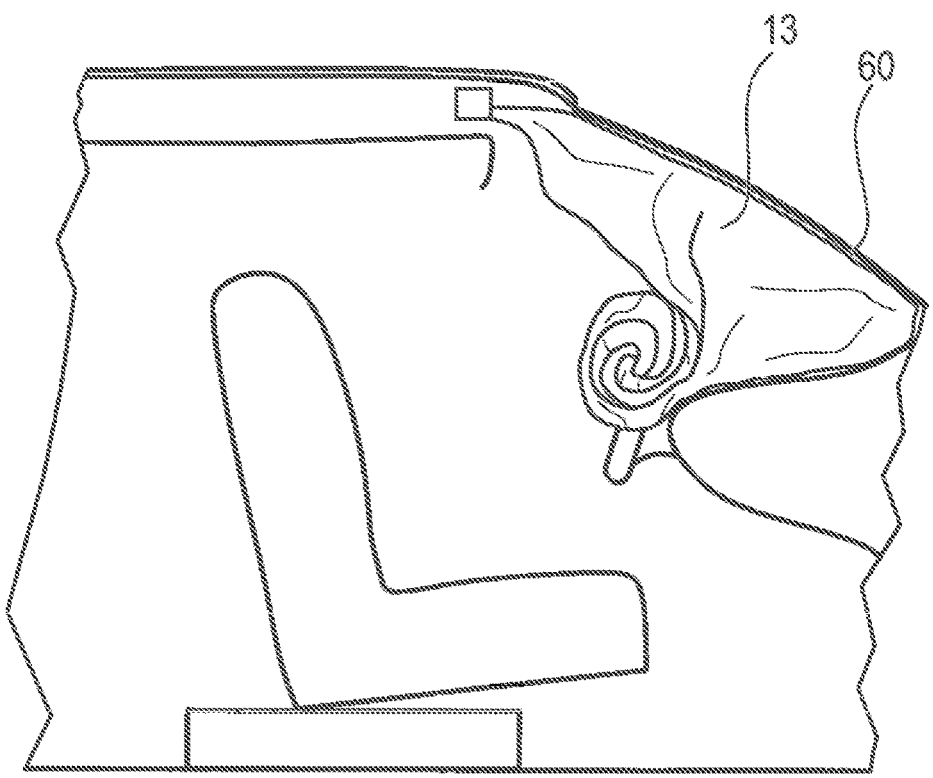
Figure 3D:
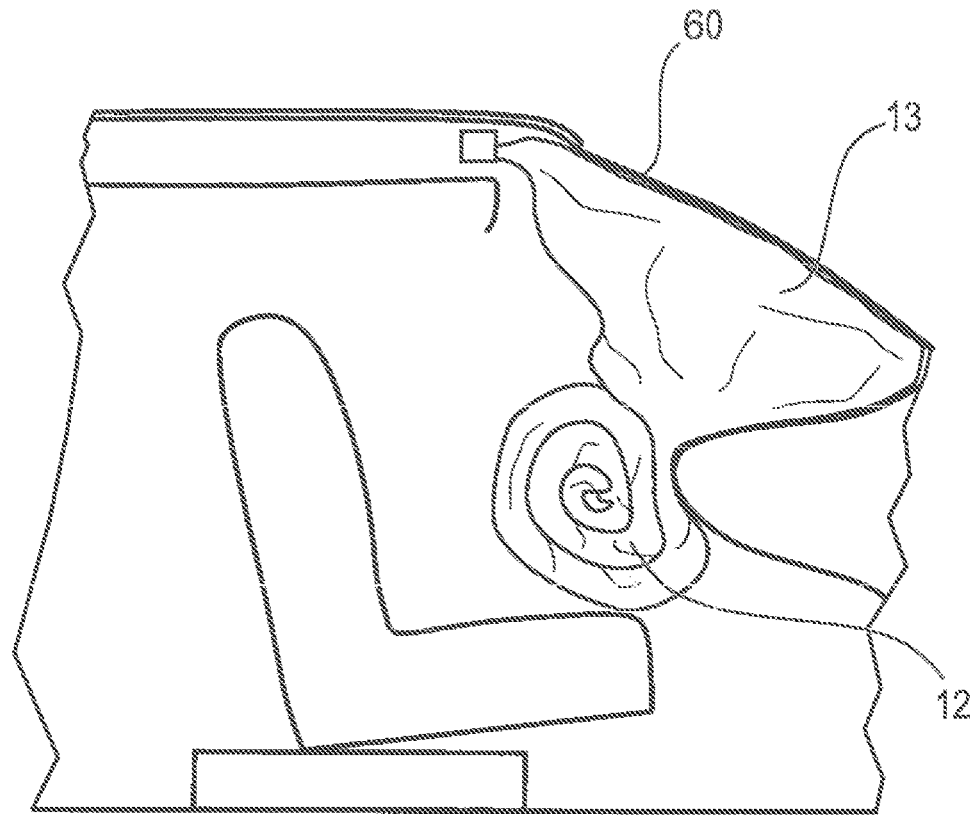
Figure 3E:
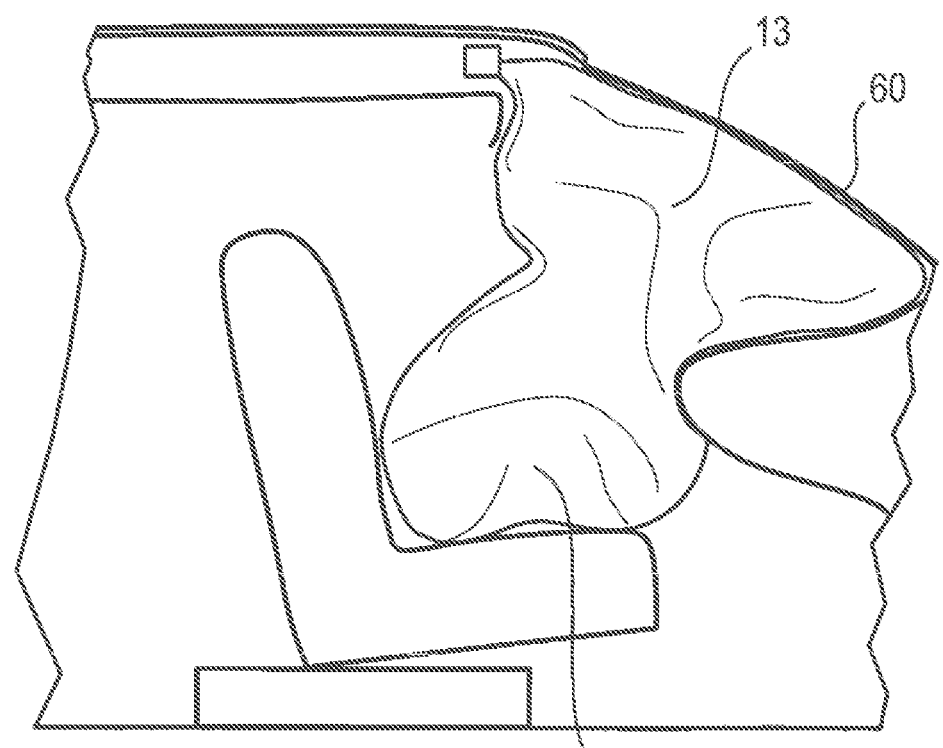
Figure 3F:
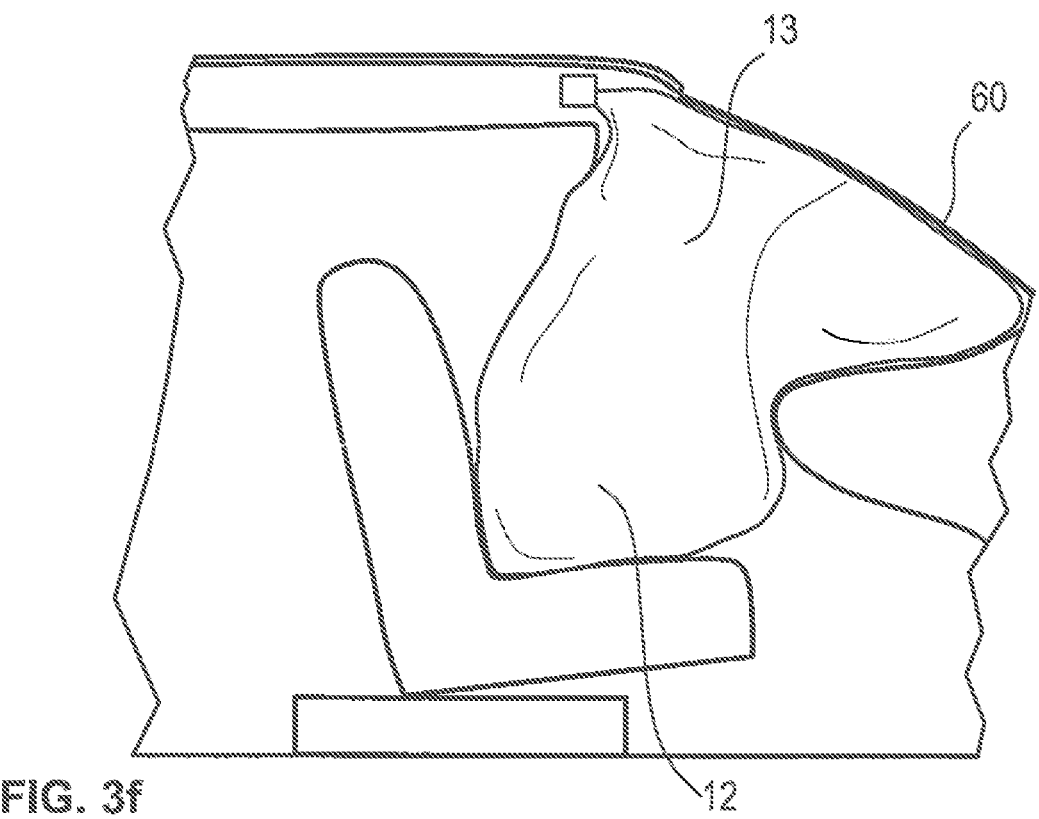
Figure 4A:
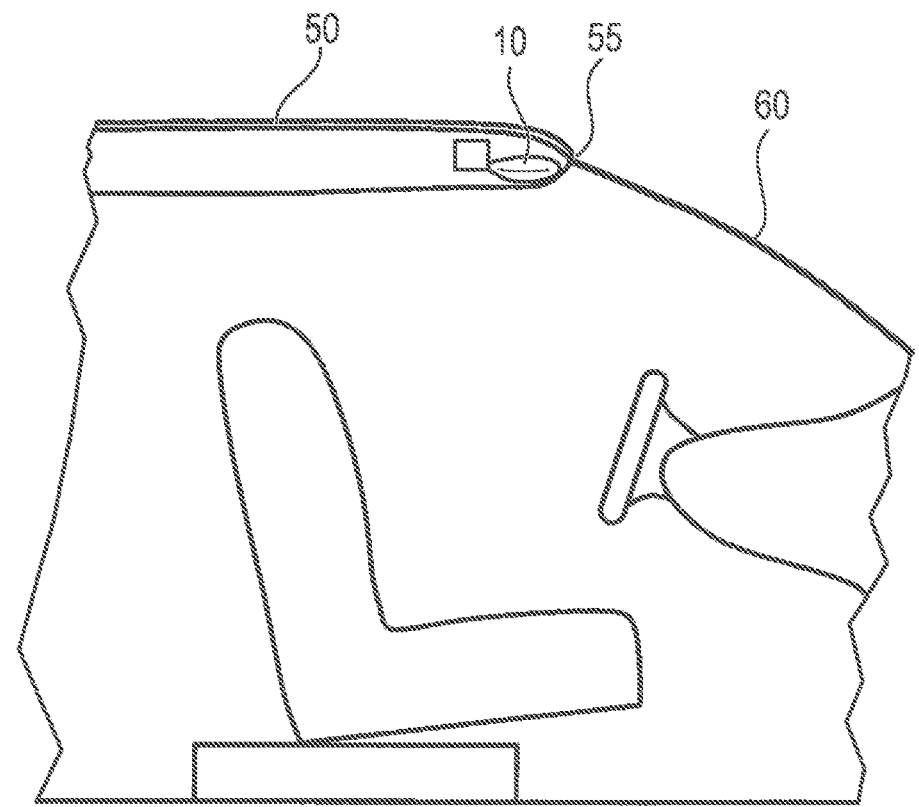
FIGS. 4a-4i: show individual phases of a release operation in connection with a second variant of the airbag according to the invention.
Figure 4B:
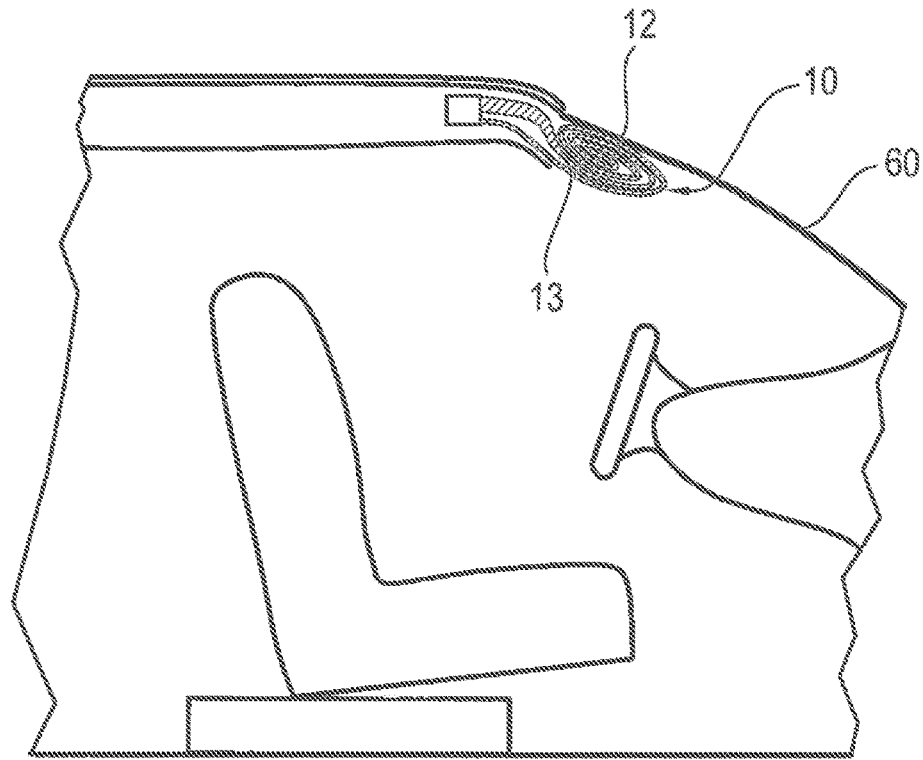
Figure 4C:
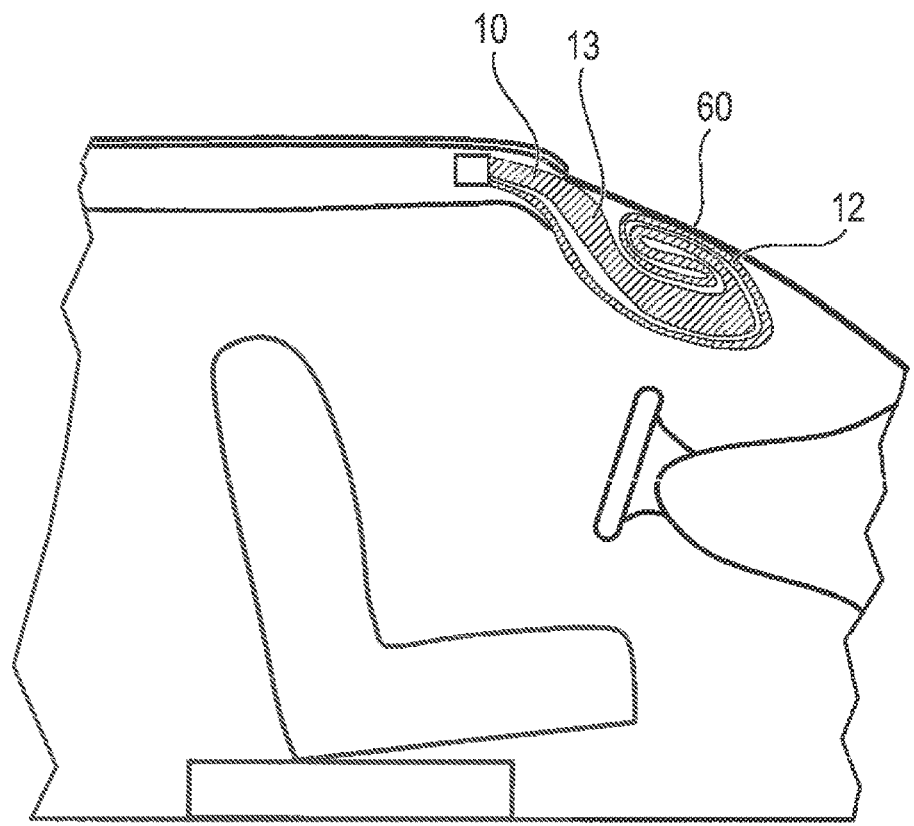
Figure 4D:
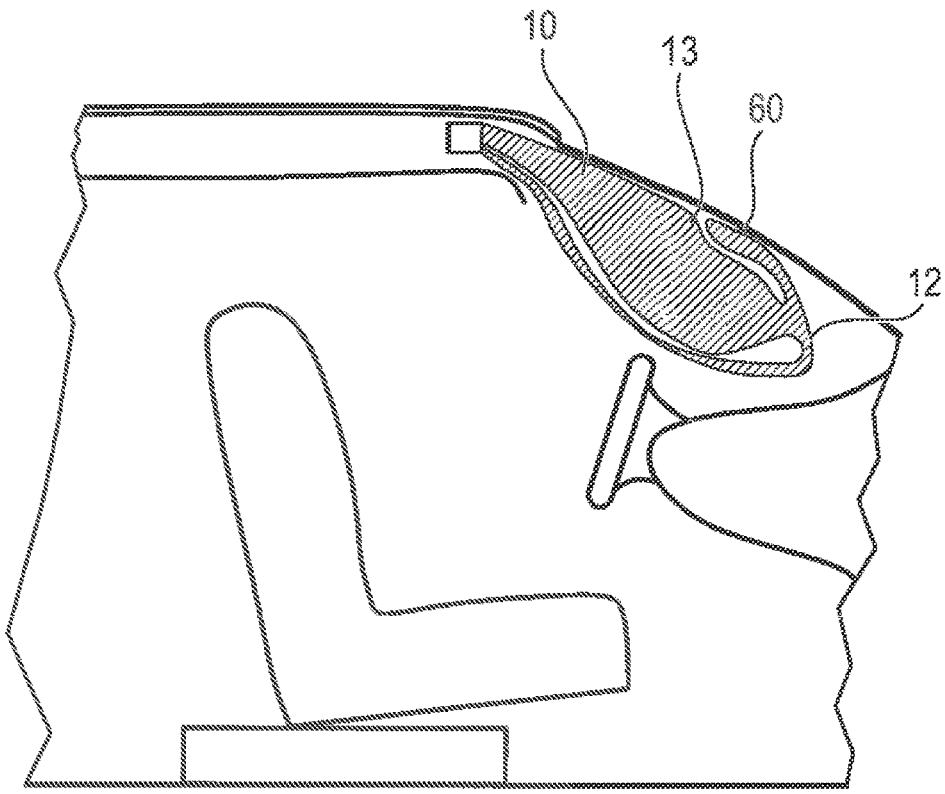
Figure 4E:
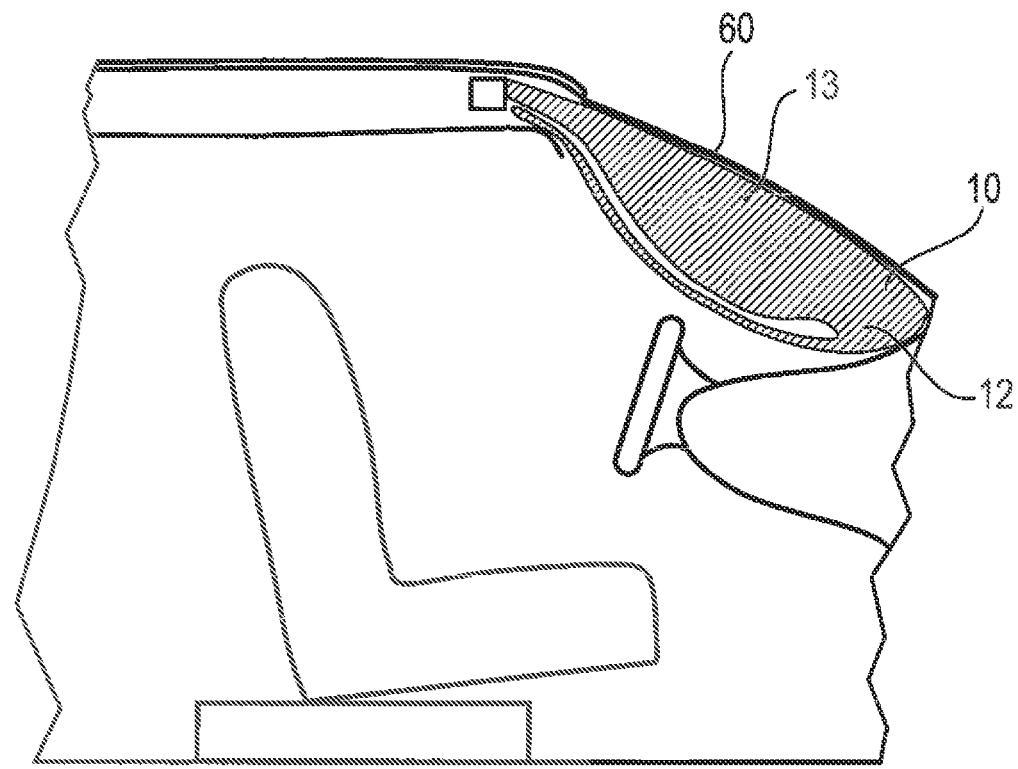
Figure 4F:
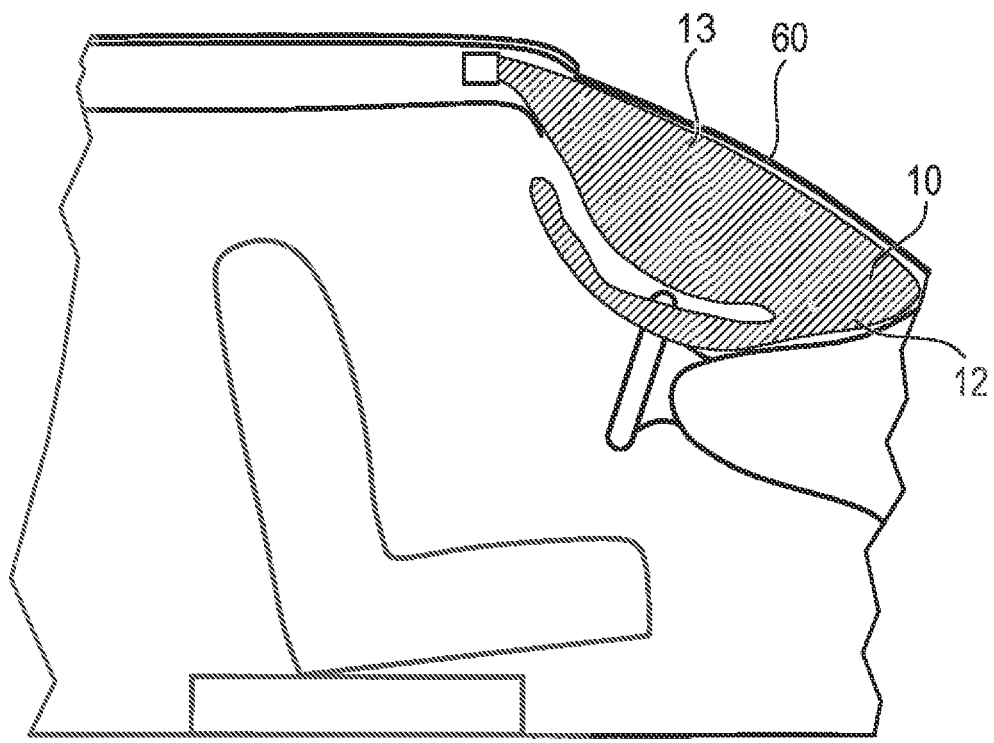
Figure 4G:
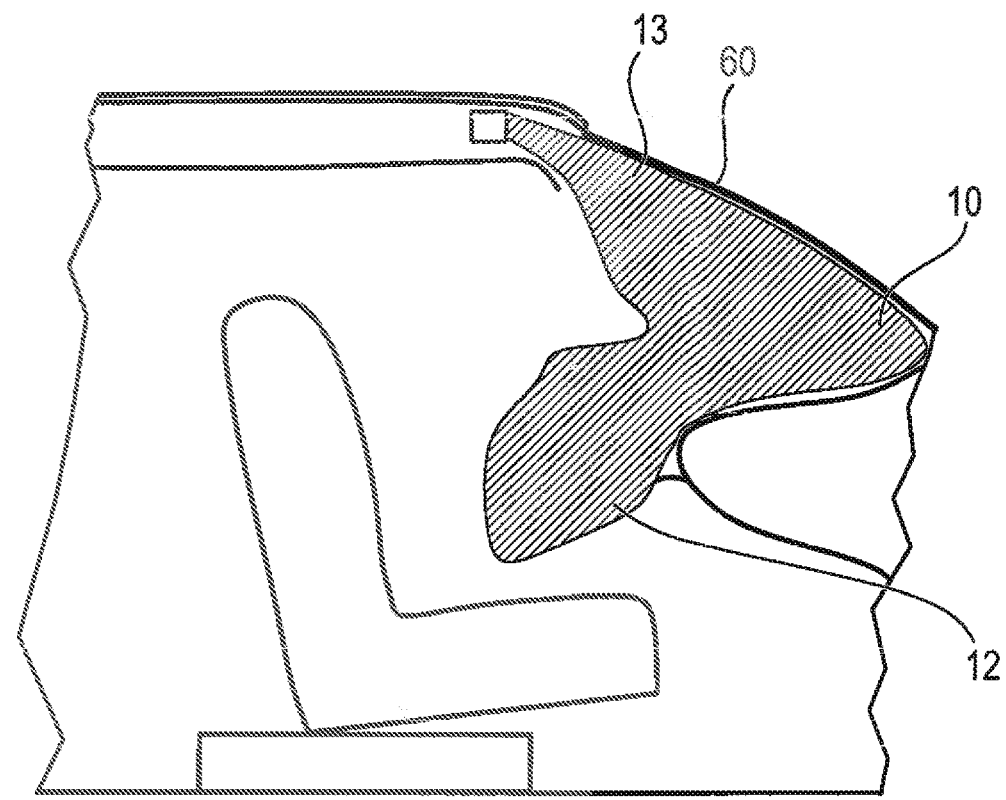
Figure 4H:
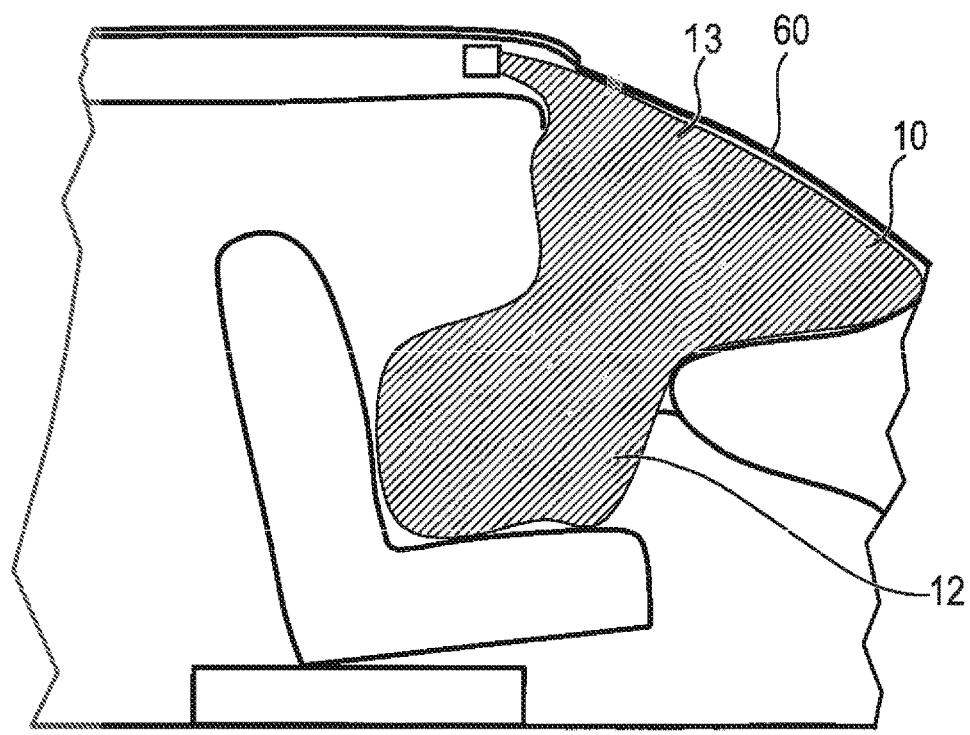
Figure 4I:
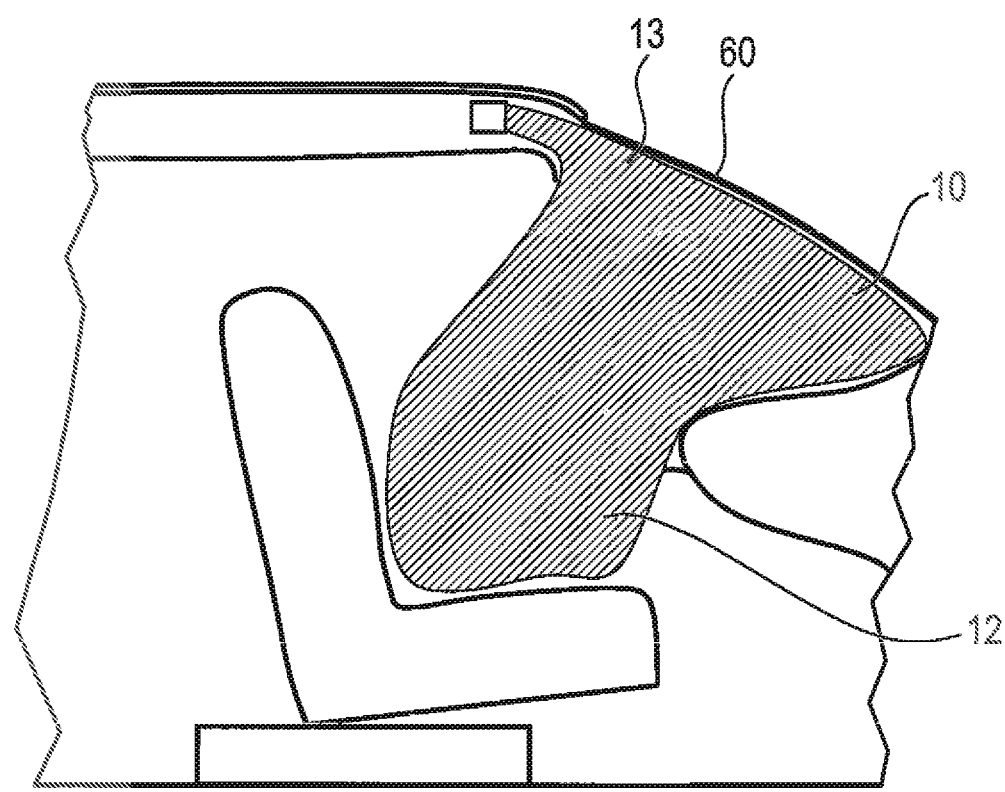

In FIG. 2e the formation of a first folding bend 14 due to the arrangement or laying of the first folded layer 17 and of the second folded layer 18 is shown in a side view. Optionally the formation of the second folding bend 20 and of the third folding bend 23 by means of a third folded layer 21 and a fourth folded layer 24 may follow.

After forming the guiding portion 13 an additional folding, especially zigzag folding, of at least one side part 32, 32' of the furled inflating portion 12 may follow, wherein the folding is carried out at right angles with the first furling direction AR and thus in the direction of the longitudinal axis L of the airbag. In particular, the additional folding or zigzag folding of at least one side part 32 and 32', resp., may be performed up to the width BE of the injection orifice 11.

In FIGS. 3a-3f the airbag 10 according to the invention is shown in the mounted state. Accordingly, the airbag 10 is configured as a component of a vehicle safety system, wherein the airbag 10 and a dedicated inflator 28 are arranged behind a cover of the roof liner of the vehicle in the area of an upper rim 55 of the windscreen 60. It is resulting from FIGS. 3b-3c that in the activated state at first the guiding portion 13 is deployed along the windscreen 60. The furled inflating portion 12 is not deployed before the guiding portion 13 has been deployed along the windscreen 60 in FIG. 3d. Accordingly, the inflated airbag 10 does not in the first instance suddenly impact on the legs of the vehicle occupant but first unrolls along the windscreen 60 so as to then be deployed in the direction of the thorax of the vehicle occupant. In this respect, increased vehicle occupant protection is provided.

From FIGS. 4a to 4i it is resulting that in the activated state first the guiding portion 13 is deployed along the windscreen 60. The inflating portion 12 furled in two layers is not deployed before the guiding portion 13 has been deployed along the windscreen 60. When the furled inflating portion 12 is almost completely deployed, the second layer facing the occupant is deployed in the direction of the vehicle occupant's legs until the airbag is fully inflated.

LIST OF REFERENCE NUMERALS 10 airbag
11 injection orifice
12 inflating portion
13 guiding portion
14 first folding bend
15 upper side
16 lower side
17 first folded layer
18 second folded layer
19 first opening
20 second folding bend
21 third folded layer
22 second opening
23 third folding bend
24 fourth folded layer
25 third opening
26 trailing edge
27, 27', 27" layer of inflating portion
28 inflator
30, 30' side part
31 zigzag fold
32, 32' side part of furled inflating portion
40 auxiliary means
50 vehicle roof
55 upper rim
60 windscreen
AR furling direction
L longitudinal axis
Z1 folding direction
Z2 folding direction
LA width of inflating portion
BE width of injection orifice

The invention claimed is:

1. A method of folding an airbag (10), to be arranged beneath a vehicle roof (50), the airbag including an injection orifice (11), a guiding portion (13) arranged adjacent thereto in the longitudinal direction and an inflating portion (12) arranged adjacent to the guiding portion (13) in the longitudinal direction, the method comprising the steps of:
   flatly spreading the airbag (10);
   laterally folding, at least in portions at least one side part (30; 30') of the airbag (10) in the direction of the longitudinal axis (L) of the airbag (10);
   furling the inflating portion (12) at least in portions starting from a trailing edge (26) of the airbag (10) that is maximally spaced apart from the injection orifice (11) in a first furling direction (AR) in the direction of the injection orifice (11);
   forming the guiding portion (13) by laying at least one folding including a first folding bend (14) against the first roll-up direction (AR) so that the deployment behavior of the airbag (10) is influenced, the first folding bend (14) being adjacent the furled inflating portion (12) and being formed by a first folded layer (17) and a second folded layer (18) of the guiding portion (13) to constitute a first opening (19) pointing in the direction of the injection orifice (11); and
   forming at least a second folding bend (20) in the guiding portion (13), wherein starting from the second folding bend (20) the second folded layer (18) and a third folded layer (21) are parallel and overlie each other thereby forming a second opening (22) pointing away from the injection orifice (11), and wherein the second folding bend is directly opposed to the first folding bend.

2. The method according to claim 1, wherein formation of at least a third folding bend (23) in the guiding portion (13), wherein starting from the third folding bend (23) the third folded layer (21) and a fourth folded layer (24) constitute a third opening (25) pointing in the direction of the injection orifice (11).

3. The method according to claim 1, wherein additional folding of at least one side part (32; 32') of the furled inflating portion (12), the folding being carried out at right angles with the first furling direction (AR).

4. The method according to claim 3, wherein the additional folding comprises zigzag folding.

5. The method according to claim 3, wherein the additional folding of at least one side part (32; 32') is performed up to the width (BE) of the injection orifice (11).

6. An airbag (10) folded according to a method in accordance with claim 1.

7. The method according to claim 1, wherein the step of laterally folding comprises zigzag folding.

8. An airbag module for being arranged beneath a vehicle roof (50), comprising an injection orifice (11) and an inflating portion (12), wherein a guiding portion (13) arranged between the injection orifice (11) and the inflating portion (12), wherein the inflating portion (12) is furled in a first furling direction (AR) in the direction of the injection orifice (11) and the guiding portion (13) is formed by laying at least one folding including a first folding bend (14) against the first furling direction (AR) such that the deployment behavior of the airbag (10) can be influenced, the first folding bend (14) being adjacent the furled inflating portion (12) and being formed by a first folded layer (17) and a second folded layer (18) of the guiding portion (13) to constitute a first opening (19) pointing in the direction of the injection orifice (11), wherein in the guiding portion (13) a second folding bend (20) is formed, wherein starting from the second folding bend (20) a second opening (22) pointing away from the injection orifice (11) is formed by the second folded layer (18) and a third folded layer (21), which are parallel and overlie each other, and wherein the second folding bend is directly opposed to the first folding bend.

9. The airbag (10) according to claim 8, wherein in the guiding portion (13) a third folding bend (23) is formed, wherein starting from the third folding bend (23) a third opening (25) pointing in the direction of the injection orifice (11) is formed by the third folded layer (21) and a fourth folded layer (24).

10. An airbag module for being arranged beneath a vehicle roof (50), comprising an airbag (10) according to claim 8, and an inflator (28) for inflating the airbag (10).

11. A vehicle safety system comprising an airbag (10) and/or comprising an airbag module according to claim 8.

12. The vehicle safety system according to claim 11, wherein the airbag (10) and/or the airbag module are arranged behind a cover of the vehicle roof liner in the area of an upper windscreen rim (55), wherein upon release the airbag (10) can be deployed and inflated along the windscreen (60).

\* \* \* \* \*